H. WALKER.
PAN LIFTER.
APPLICATION FILED SEPT. 1, 1909.

938,187.

Patented Oct. 26, 1909.

WITNESSES:

INVENTOR
Henry Walker
BY
ATTORNEY.

UNITED STATES PATENT OFFICE.

HENRY WALKER, OF WILMINGTON, DELAWARE.

PAN-LIFTER.

938,187.  Specification of Letters Patent.  Patented Oct. 26, 1909.

Application filed September 1, 1909. Serial No. 515,678.

*To all whom it may concern:*

Be it known that I, HENRY WALKER, a citizen of the United States of America, residing in Wilmington, in the county of Newcastle and State of Delaware, have invented a certain new and useful Improvement in Pan-Lifters, of which the following is a true and exact description, reference being had to the accompanying drawings, which form a part thereof.

My invention relates to a device in the nature of a detachable handle especially adapted for use in connection with saucepans and the like, the object of my invention being to provide a simple and efficient device of this kind.

The nature of my improvements will be best understood as described in connection with the drawings in which they are illustrated, and in which—

Figure 1:
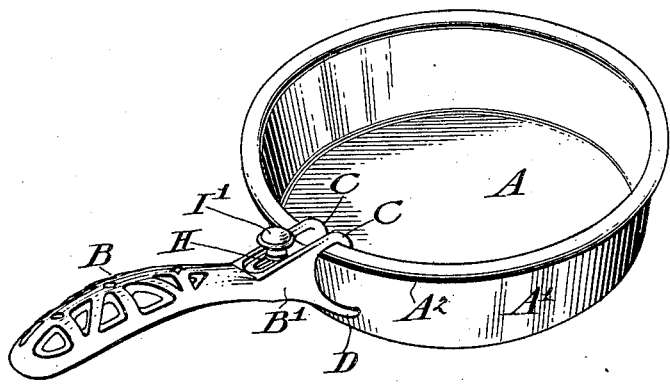
Figure 2:
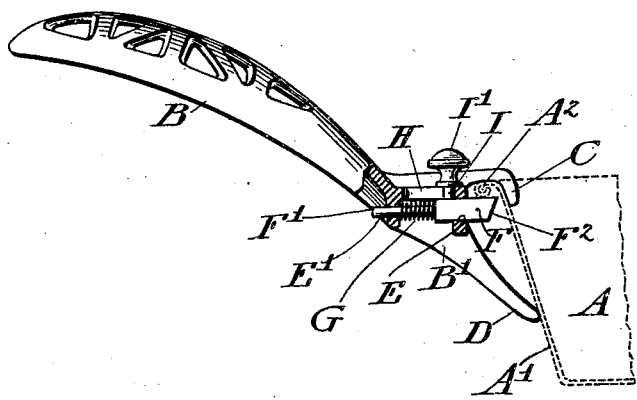
Figure 3:
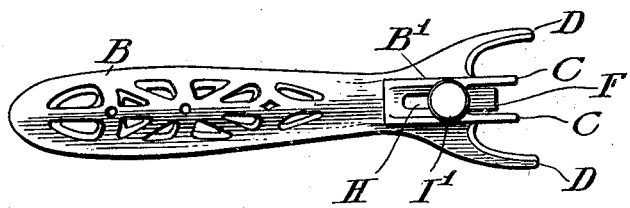

Figure 1 is a perspective view of a pan with my lifter attached thereto. Fig. 2 is a side elevation of the lifter, and Fig. 3 is a plan view thereof.

A is a pan having the usual sides A', and beveled or beaded edge A². The lifter consists of a handle B, having a head B', from which extend two hooked arms C, C, adapted to pass inward and downward over the edge of the pan indicated at A, see Figs. 1 and 2. The head is also formed or provided with downwardly extending arms D, D, preferably flaring outward as shown and adapted to rest against the side of the pan.

E, E', are guideways formed in downwardly extending flanges of the head for the spring latch F, which is preferably formed with a beveled front edge, as indicated at F², and is shown as a pin like extension F', which passes through the perforation E'.

G is the spring which tends to force the latch forward.

H is a slot in the head B', lying immediately over the spring latch F and through which passes a pin I, having a head I', for convenient manipulation, the pin I, of course, being secured to the latch F.

When it is desired to attach the lifter to a pan the bevel edge F², of the latch is pressed against the rim A², of the pan and the lifter pushed downward whereupon the latch will first be retracted and then sprung forward under the rim A², as indicated in Fig. 2, the arms C, C, gripping the inside of the edge of the pan and the arms D, D, resting against the side of the pan, the lifter is then securely connected with the pan which can be lifted and moved by means of the lifter and the connection between the two will remain perfect until the latch F is withdrawn as by drawing back the knob I', after which the lifter can be readily detached.

Having now described my invention, what I claim as new, and desire to secure by Letters Patent, is:

1. A pan lifter having in combination, a handle, a hooked arm or arms adapted to extend inward and downward over the edge of a pan, a retractable spring latch adapted to extend beneath and engage the beaded rim of a pan and one or more downwardly extending arms adapted to rest against the side of a pan.

2. A pan lifter having in combination, a handle, a hooked arm or arms adapted to extend inward and downward over the edge of a pan, a retractable beveled spring latch adapted to extend beneath and engage the beaded rim of a pan and one or more downwardly extending arms adapted to rest against the side of a pan.

3. A pan lifter having in combination, a handle, a hooked arm or arms adapted to extend inward and downward over the edge of a pan, a retractable spring latch adapted to extend beneath and engage the beaded rim of a pan and two diverging downwardly extending arms adapted to rest against the side of a pan.

4. A pan lifter having in combination, a handle, a head B', provided with spring latch guides on its lower side and slotted at H, hooked arms C, C, extending from the top of the head, and arms D, D, extending from the bottom of the head, a retractable spring latch F, guided in the head and a latch actuating pin I, I', extending through slot H, and secured to the latch.

HENRY WALKER.

Witnesses:
JOSEPH H. WARFIELD, Jr.,
FRANCIS J. MCNULTY.